(12) United States Patent
Essig et al.

(10) Patent No.: US 6,276,468 B1
(45) Date of Patent: Aug. 21, 2001

(54) HYDROSTATIC VEHICLE DRIVE WITH DIFFERENTIAL LOCK

(75) Inventors: Heinz-Gerhard Essig, Lonsee (DE); Chris Shrive, Dunfermline (GB)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 09/530,832

(22) PCT Filed: Jul. 14, 1999

(86) PCT No.: PCT/EP99/04977

§ 371 Date: May 3, 2000

§ 102(e) Date: May 3, 2000

(87) PCT Pub. No.: WO00/06408

PCT Pub. Date: Feb. 10, 2000

(30) Foreign Application Priority Data

Jul. 28, 1998 (DE) .............................. 198 33 942

(51) Int. Cl.[7] .................................................. B62D 11/18
(52) U.S. Cl. ..................... 180/6.2; 180/307; 180/308; 60/484; 60/486
(58) Field of Search ........................ 180/305, 307, 180/308, 6.2, 6.7, 6.48, 242; 60/484, 486

(56) References Cited

U.S. PATENT DOCUMENTS

| | | |
|---|---|---|
| 4,570,441 | 2/1986 | Yoshida et al. . |
| 4,606,428 | 8/1986 | Giere . |
| 5,137,100 | * 8/1992 | Scott et al. ........................ 180/6.48 |
| 5,427,195 | * 6/1995 | Paul et al. ............................. 180/308 |

FOREIGN PATENT DOCUMENTS

| | | |
|---|---|---|
| 30 38 175 A1 | 4/1981 | (DE) . |
| 0 025 372 A1 | 3/1981 | (EP) . |
| 0 378 742 A2 | 7/1990 | (EP) . |
| 2 719 001 | 10/1995 | (FR) . |

* cited by examiner

Primary Examiner—J. J. Swann
Assistant Examiner—F. Zeender
(74) Attorney, Agent, or Firm—Scully, Scott, Murphy & Presser

(57) ABSTRACT

A hydrostatic vehicle drive (1) comprises a first hydropump (2) and a second hydropump (3) as well as a first hydromotor (7) and a second hydromotor (12). The hydromotors (7, 12) each drive separate drive lines. During straight-ahead travel operation, the hydropumps (2, 3) and the hydromotors (7, 12) are coupled to one another in a single, closed hydraulic circuit without crossed connections in such a manner that an input connection (6) of the first hydromotor (7) is connected to an output connection (5) of the first hydropump (2) and an input connection (9) of the second hydropump (3) is connected to an output connection (8) of the first hydromotor (7). An input connection (11) of the second hydromotor (12) is connected to an output connection (10) of the second hydropump (3), whilst an input connection (14) of the first hydropump (2) is connected to an output connection (13) of the second hydromotor (12).

14 Claims, 7 Drawing Sheets

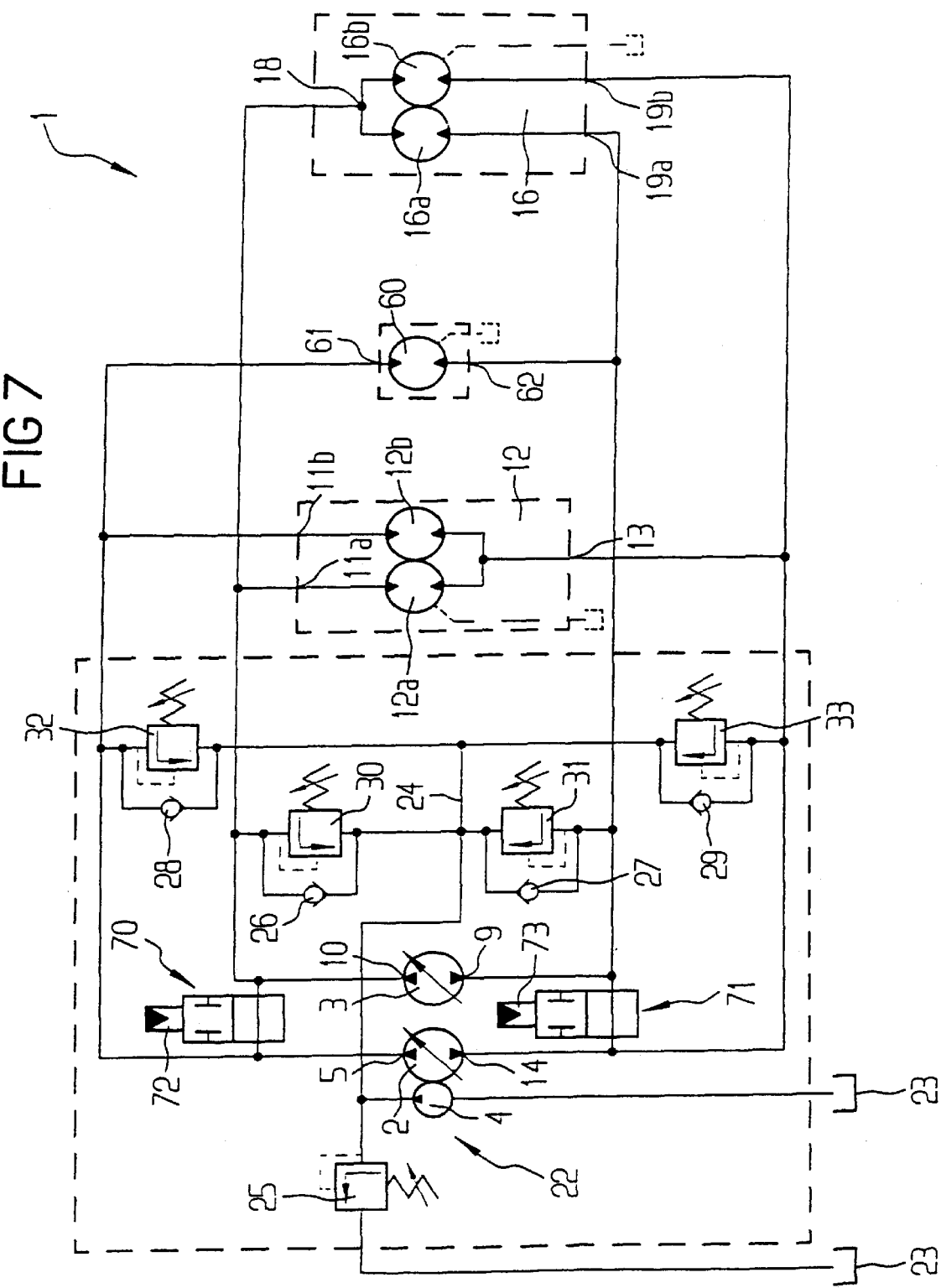

HYDROSTATIC VEHICLE DRIVE WITH DIFFERENTIAL LOCK

The invention relates to a hydrostatic vehicle drive according to the preamble of claim 1.

A hydrostatic vehicle drive according to the preamble of claim 1 is known from EP 0 378 742 A2. The hydrostatic vehicle drive presented in this specification comprises two hydraulic circuits which are separated from one another when the vehicle travels around bends, a hydropump and a hydromotor being provided in each hydraulic circuit. The two hydropumps are driven via a common drive shaft by a drive motor, for example a diesel engine. Via a suitable gearing system, the hydromotors each drive a track mechanism, for example the left-hand track mechanism and the right-hand track mechanism of a digger.

When the vehicle is travelling straight ahead, a problem can occur in that the left-hand and right-hand drive tracks can be subjected to different degrees of slip. In extreme cases, one of the two drive tracks can spin completely. This problem is dispensed with in EP 0 378 742 A2 in that the drive shafts of both hydromotors are rigidly connected to one another during straight-ahead travel operation by a coupling which can be electromagnetically actuated. In order to connect the electromagnetically actuated coupling to the two hydromotors, additional links are required. The mechanical outlay for connecting the two hydromotors is considerable, so that a cost-effective realisation of the hydrostatic vehicle drive disclosed in EP 0 378 742 A2 is impossible.

In order to improve straight-ahead travel properties, it is further proposed to connect the two hydraulic circuits, which are separated during bend travel operation, by electromagnetically operable valves during straight-ahead travel operation, in order to compensate unequal pressure conditions in the two hydraulic circuits by cross flows.

A similar state of the art is disclosed in DE 30 38 175 A1. Here too, in order to improve the straight-ahead travel properties, it is proposed to connect the two hydromotors on the drive side with one another by means of a hydraulically operable direct coupling and suitable gearing during straight-ahead travel operation, and furthermore to connect the two hydraulic circuits to one another in parallel via a connecting valve in the case of straight-ahead travel operation. Here too, the structural outlay for the mechanical connection of the two drive lines is considerable.

It is the object of the invention to provide a hydrostatic vehicle drive, in which good straight-ahead travel properties are ensured particularly in the case of slip in one of the drive lines, which can nevertheless be realised in a cost-effective manner.

This object is attained by the characterising features of both claim 1 and claim 7, in each case in association with the generic features.

The solution according to the invention according to claim 1 is based upon the knowledge that a rigid coupling of the hydromotors with the hydropumps can be attained by an alternate, series connection of the first hydropump, followed by the first hydromotor, followed by the second hydropump, followed by the second hydromotor. In the design according to the invention, the hydropumps and the hydromotors are therefore arranged in series, whilst in conventional hydrostatic vehicle drives the hydropumps and the hydromotors are either arranged in separate hydraulic circuits or these separate hydraulic circuits are connected during straight-ahead travel operation in such a manner that all hydromotors and hydropumps are arranged parallel to one another. If, in the case of this conventional design of the drive line, one of the two hydromotors experiences a large degree of slip or even spins in extreme cases, then the main conveyed flow flows mainly through this hydromotor connected to the spinning drive line, which additionally increases the rotational speed of said hydromotor, so that the hydrostatic vehicle drive is rendered ineffective. In contrast, in the solution according to the invention, the conveyed flow conveyed by the hydropumps is forcibly guided through the hydropumps of all drive lines, so that the absorption volume of both hydromotors corresponds. The hydromotors are each hydraulically supported by the upstream hydropump, so that excessive slip or spinning of the drive lines connected to the hydromotors is prevented.

Claims 2 to 6 relate to advantageous developments of the hydrostatic vehicle drive according to claim 1.

According to claim 2, a changeover valve is advantageously provided, which allows for a changeover from straight-ahead travel operation to bend travel operation. During bend travel operation, the two hydromotors and the two hydropumps are separated from one another and connected to each other in separate hydraulic circuits in each case. However, during straight-ahead travel operation, the hydropumps and the hydromotors are arranged alternately in series as described above. According to claim 3, a changeover valve of this type can be realised in a cost-effective manner as a simple 4/2-way valve with a parallel and a crossed switching position.

According to claim 4, a third and fourth hydromotor can be added to the first and second hydromotors, the third hydromotor being connected in parallel with the first hydromotor and the fourth hydromotor being connected in parallel with the second hydromotor. In this respect, the individual hydromotors drive four drive wheels, for example, it being possible to associate the first and third hydromotor with a first vehicle axle and the second and fourth hydromotor with a second vehicle axle. In order to switch off one of the vehicle axles in each case, according to claim 5 switching valves can be provided, which switch off the corresponding hydromotors. When switching off the hydromotors, it is advantageous according to claim 6 to supply the switched-off hydromotors with a supply pressure via a supply device. In this manner, the switched-off hydromotors are prevented from running without connection to the pressure fluid. As a result of the development according to the invention, it is ensured that the hydromotors are at least acted upon by the supply pressure of the supply device, so that sufficient lubrication and cooling of the hydromotors is guaranteed.

The solution according to claim 7 is based upon the knowledge that a slip-free hydraulic vehicle drive can also be realised by using double motors in a special crossed mixed circuit arrangement. Since all hydromotors are not only connected to a hydropump, but the two partial hydromotors are connected either at their inlet or outlet to both hydropumps, it is ensured that the hydromotors of both drive lines are supported by both hydropumps. As a result of the measure according to the invention, it is ensured in the event of slip or even spinning of one of the drive lines that the conveyed flow conveyed by the hydropumps is prevented from flowing mainly only through the hydromotors of this drive line. Rather, a forced pressure supply of the other drive line is also ensured.

Claims 8 to 14 relate to advantageous developments of the hydrostatic vehicle drive according to claim 7.

In the advantageous development according to claim 8, not two but four hydromotors are provided, which can drive different drive wheels in each case. The additional hydromotors are also constructed as double hydromotors comprising two partial hydromotors in each case and are supported either at their outlet or inlet by both hydropumps, none of the four hydromotors being connected to the two hydropumps in the same manner. In this respect, the hydromotors can be connected according to claim 9 in such a manner that two hydromotors as a pair drive a vehicle axle in each case.

Alternatively, it is possible according to claim 10 to provide only a single further hydromotor, which drives s third vehicle wheel. It is not necessary to construct this third hydromotor as a double hydromotor. The input of this third hydromotor is preferably connected to the first hydropump, whilst its output is connected to the second hydropump, so that a crossed circuit arrangement is again realised and the conveyed flow distribution of the two hydropumps is not impaired as compared with the drive by only two hydromotors constructed as double hydromotors. According to claim 11, this additional hydromotor can drive a further vehicle wheel.

According to claim 12, this additional hydromotor can be switched off, the switched-off hydromotor preferably being supplied according to claim 13 with a supply pressure via a supply device.

According to claim 14, it can be advantageous to connect the inputs and outputs of the two hydropumps with one another by suitable by-pass valves.

Preferred embodiments of the invention will be described in further detail in the following with reference to the drawings, in which:

FIG. 7 is a hydraulic circuit diagram of a seventh embodiment of the hydrostatic vehicle drive according to the invention.

FIG. 1 is a hydraulic circuit diagram of a first embodiment of the invention. The hydrostatic vehicle drive according to the invention is generally indicated by the reference numeral 1.

Figure 1:
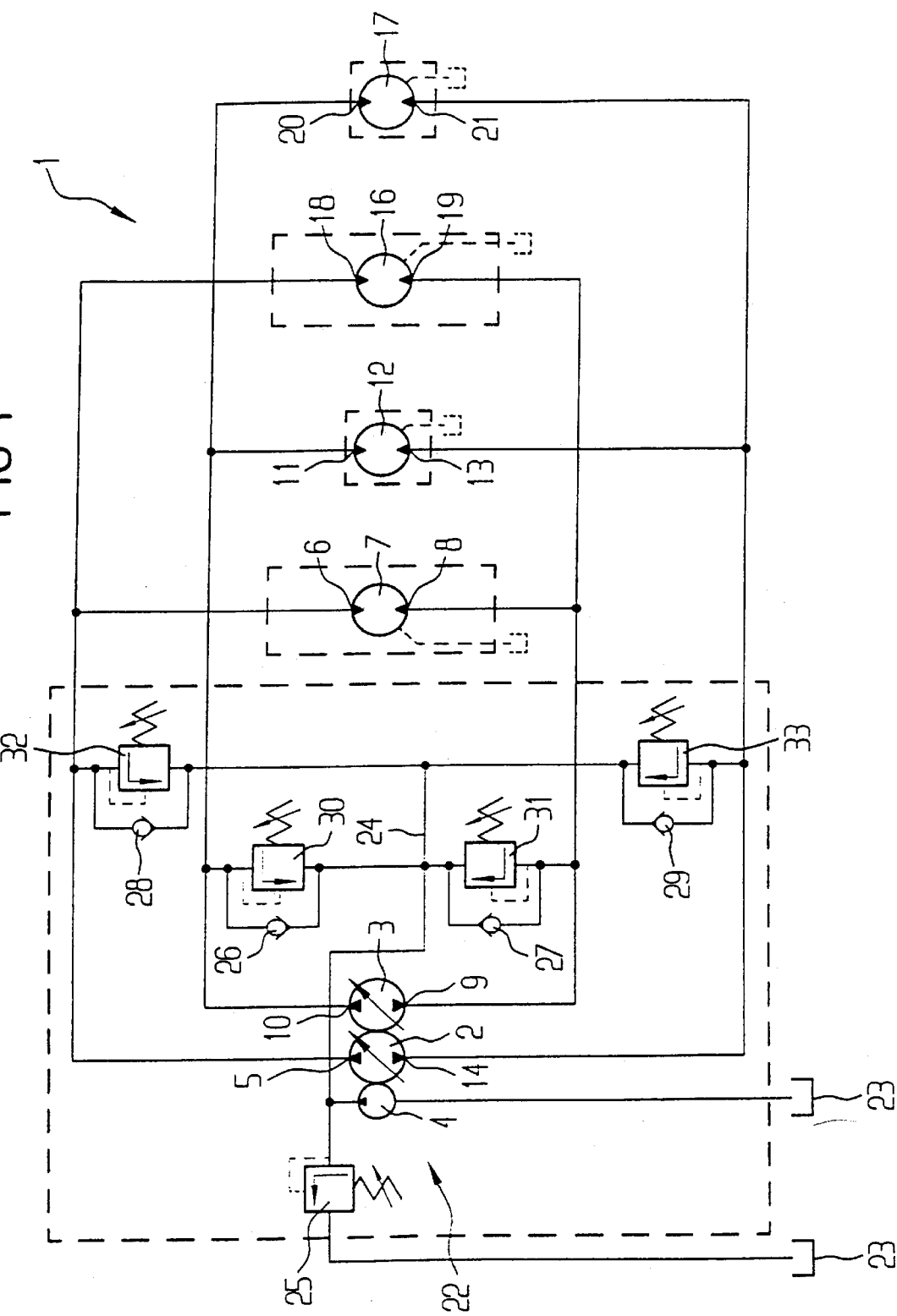
FIG. 1 is a hydraulic circuit diagram of a first embodiment of the hydrostatic vehicle drive according to the invention.

A first hydropump 2 preferably constructed as an adjusting pump, a second hydropump 3 also preferably constructed as an adjusting pump, and an auxiliary pump 4 are driven by a drive motor, not shown, for example an internal combustion engine. The first and second hydropumps 2 and 3 and the auxiliary pump 4 are preferably arranged on a common drive shaft.

The output connection 5 of the first hydropump 2 is connected via a hydraulic connection line to an input connection 6 of a first hydromotor 7. An output connection 8 of the first hydromotor 7 is connected via a hydraulic connection line to an input connection 9 of the second hydropump 3. The output connection 10 of the second hydropump 3 is hydraulically connected to an input connection 11 of a second hydromotor 12. In contrast, the output connection 13 of the second hydromotor 12 is hydraulically connected to the input connection 14 of the first hydropump 2. The hydropumps 2 and 3 and the hydromotors 7 and 12 are therefore arranged in series in such a manner that a hydropump is followed by a hydromotor in the hydraulic circuit and vice versa, i.e. a hydromotor is followed by a hydropump. The conveyed flow conveyed by the hydropumps 2 and 3 is therefore forcibly guided through both hydromotors 7 and 12, the two hydromotors 7 and 12 driving different drive lines, for example different drive wheels.

Slip in one of the two drive lines is effectively prevented by the measure according to the invention, since the hydromotor connected to the corresponding drive line is linked into the hydraulic circuit in such a manner that the absorption volume of this hydromotor cannot increase without increasing the conveying volume of both hydropumps 2 and 3. Slip of the driven drive wheels or even spinning of the drive wheels is therefore counteracted.

According to the development illustrated in FIG. 1, a third hydromotor 16 and a fourth hydromotor 17 are additionally provided, the third hydromotor 16 and the fourth hydromotor 17 being able to drive a third and fourth drive wheel respectively. In this case, the third hydromotor 16 is connected in parallel with the first hydromotor 7 and the fourth hydromotor 17 in parallel with the second hydromotor 12 in such a manner that an input connection 18 of the third hydromotor 16 is connected to the output connection 5 of the first hydropump 2, an output connection 19 of the third hydromotor 16 is connected to the input connection 9 of the second hydropump 3, an input connection 20 of the fourth hydromotor 17 is connected to the output connection 10 of the second hydropump 3 and the output connection 21 of the fourth hydromotor 17 is connected to the input connection 14 of the first hydropump 2.

The drive wheels of the first hydromotor 7 and third hydromotor 16 on the one hand and the drive wheels of the second hydromotor 12 and the fourth hydromotor 17 on the other hand are advantageously associated in pairs with a vehicle axis in each case.

In FIG. 1, a supply device is also provided, which is generally indicated by the reference numeral 22. The auxiliary pump 4 of the supply device draws pressure fluid from a pressure fluid tank 23 and feeds said fluid into a supply line 24. Via a pressure relief valve 25 connected to the pressure fluid tank 23, the pressure in the supply line 24 is regulated to a constant level. Via non-return valves 26 to 29, the pressure fluid which is to be supplied is supplied to those sections of the closed hydraulic circuit which are conveying the low pressure. In this respect, it should be noted that the line sections of the hydraulic circuit conveying high pressure and low pressure reverse in the event of a reversal of the direction of rotation of the hydromotors 7, 12, 16 and 17 and therefore a reversal of the conveying direction of the two hydropumps 2 and 3. of course, according to the present description, it is then necessary to replace the input connections of the hydropumps and hydromotors for output connections and to replace the output connections of the hydropumps and hydromotors for input connections.

Pressure relief valves 30 to 33 ensure that the pressure in the line sections of the closed hydraulic circuit respectively conveying high pressure does not exceed a given maximum value. If this maximum value is reached, then the pressure relief valve connected with this line section opens and discharges pressure fluid via the pressure relief valve 25 to the pressure fluid tank 23.

Figure 2:
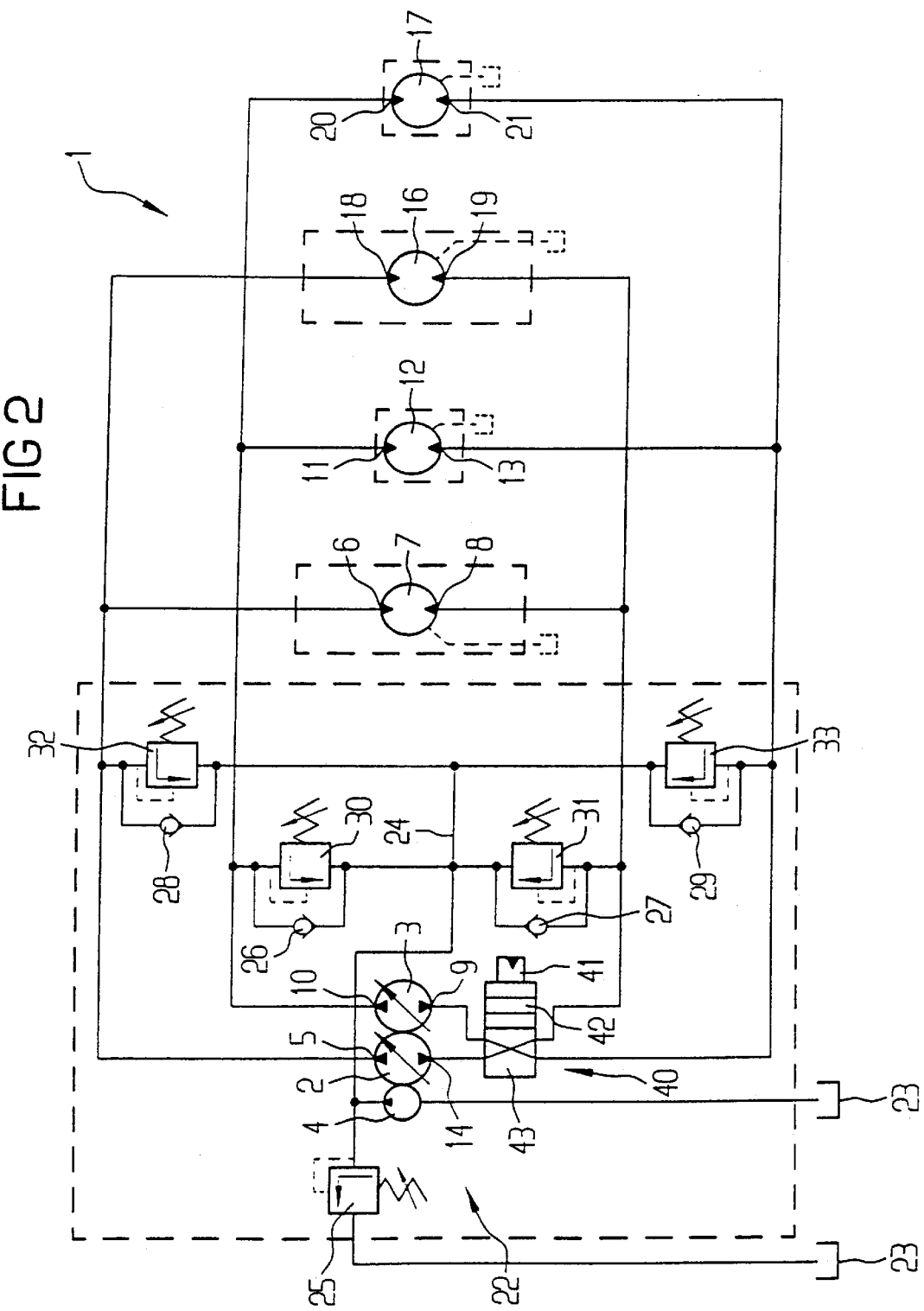
FIG. 2 is a hydraulic circuit diagram of a second embodiment of the hydrostatic vehicle drive according to the invention.

FIG. 2 shows a second embodiment of the hydrostatic vehicle drive according to the invention. Elements which have already been described are provided in FIG. 2 and in the following drawings with corresponding reference numerals, so that a repeated description is therefore unnecessary.

In contrast to the embodiment illustrated in FIG. 1, in the embodiment of FIG. 2 an additional changeover valve 40 is provided, which is constructed in the embodiment as a 4/2-way valve. In the embodiment, the changeover valve 40 connects the outputs 8 and 19 of the first hydromotor 7 and third hydromotor 16 on the one hand and the outputs 13 and 21 of the second hydromotor 12 and fourth hydromotor 17 on the other hand to the inputs 9 and 14 of the hydropumps 2 and 3. The changeover valve 40 can be actuated via an electromagnetic transmitter 41 and has a first switching position 42 for a parallel connection of its inputs and outputs and a second switching position 43 for a crossed, alternate connection of its inputs and outputs.

When the changeover valve 40 is in its first switching position 42, the hydrostatic vehicle drive operates in straight-ahead travel operation in such a manner as already described with the aid of FIG. 1. However, when the changeover valve 40 is adjusted into its second switching position 43, as illustrated in FIG. 2, then the hydrostatic vehicle drive operates in bend travel operation. In this bend travel operation, two hydraulic circuits are formed, the first hydromotor 7 and the third hydromotor 16 connected in parallel with the first hydromotor are connected both at their inputs and outputs exclusively to the first hydropump 2. In corresponding fashion, the second hydromotor 12 and the fourth hydromotor 17 connected in parallel are connected both at their inputs and outputs exclusively to the second hydropump 3. By rinsing the two hydropumps 2 and 3 to different degrees, a different conveyed flow can be attained in the two separated hydraulic circuits, so that the different drive lines, which drive the left wheels and the right wheels, for example, are acted upon differently, so that the vehicle can carry out bend travel. During the transition to straight-ahead travel operation, the changeover valve 40 is then switched back into the first switching position 42.

Figure 3:
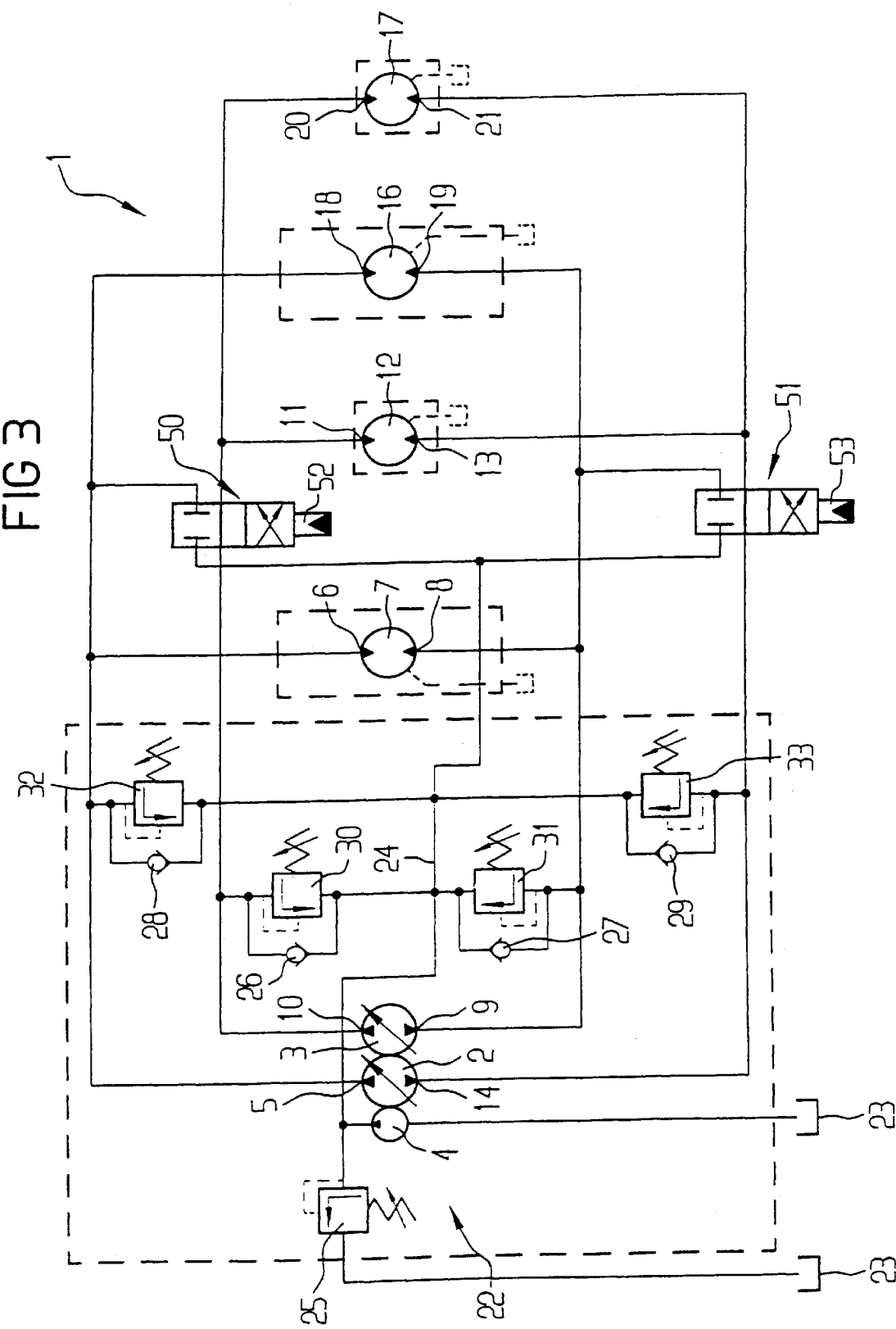
FIG. 3 is a hydraulic circuit diagram of a third embodiment of the hydrostatic vehicle drive according to the invention.

FIG. 3 shows a third embodiment of the hydrostatic vehicle drive 1 according to the invention.

Additionally to the embodiment illustrated in FIG. 1, in the embodiment of FIG. 3 two switching valves 50 and 51 are provided, which in the illustrated embodiment are constructed as 4/2-way valves and can be actuated by means of electromagnetic transmitters 52 and 53.

In the basic position illustrated in FIG. 3, the second hydromotor 12 and the fourth hydromotor 17 are connected to the hydraulic circuit as described with the aid of FIG. 1. However, when the switching valves 50 and 51 are switched over into their respective other switching position, the hydromotors 12 and 17 are separated from the hydraulic circuit and connected to the supply line 24 of the supply device 22. The vehicle axle connected to the hydromotors 12 and 17 is then no longer driven, so that the hydromotors 12 and 17 run in a load-free manner. As a result of the connection with the supply line 24, the hydromotors 12 and 17 are adequately lubricated and cooled.

Figure 4:
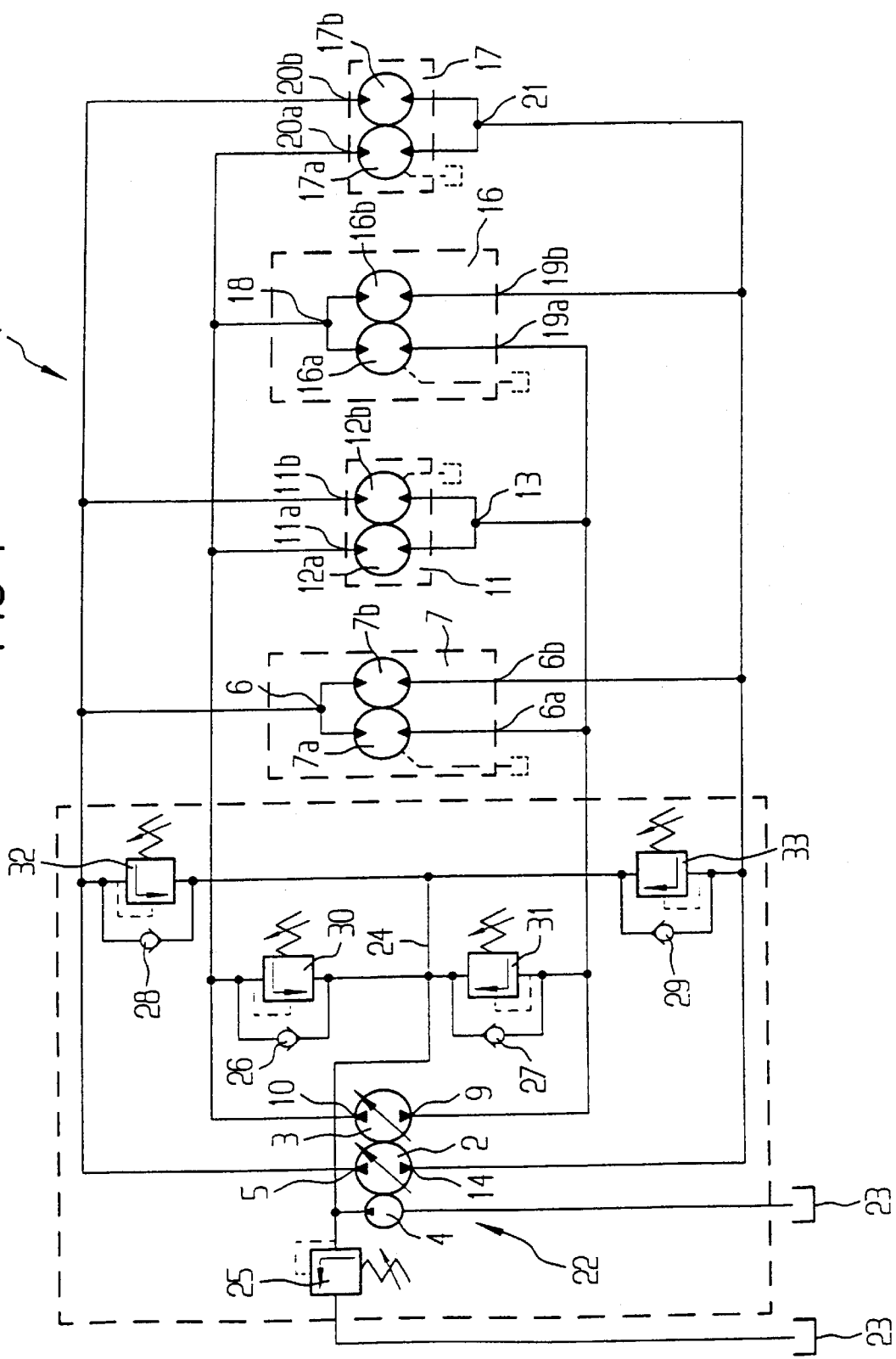
FIG. 4 is a hydraulic circuit diagram of a fourth embodiment of the hydrostatic vehicle drive according to the invention.

FIG. 4 shows a fourth embodiment of the hydrostatic vehicle drive according to the invention, which fundamentally differs from the embodiments described so far.

In contrast to the embodiments of FIGS. 1 to 3, the hydromotors 7, 12, 16 and 17 in the embodiment of FIG. 4 are not constructed as single hydromotors but as double hydromotors. The hydromotors 7 or 12 or 16 or 17 are each formed by a first partial hydromotor 7a or 12a or 16a or 17a and a second partial hydromotor 7b or 12b or 16b or 17b.

The individual partial hydromotors are connected to the two hydropumps 2 and 3 and therefore to a closed hydraulic circuit in such a manner that the common input connection 6 of the two partial hydromotors 7a and 7b of the first hydromotor 7 is connected to the output connection 5 of the first hydropump 2. Furthermore, an output connection 6a of the first partial hydromotor 7a of the first hydromotor 7 is connected to the input connection 9 of the second hydropump 3 and an output connection 6b of the second partial hydromotor 7b of the first hydromotor 7 is connected to an input connection 14 of the first hydropump 2. In addition, an input connection 11a of the first partial hydromotor 12a of the second hydromotor 12 is connected to an output connection 10 of the second hydropump 3 and an input connection 11b of the second partial hydromotor 12b of the second hydromotor 12 is connected to the output connection 5 of the first hydropump 2. A common output connection 13 of the two partial hydromotors 12a and 12b of the second hydromotor 12 is connected to the input connection 9 of the second hydropump 3.

A common input connection 18 of the two partial hydromotors 16a and 16b of the third hydromotor 16 is connected to the output connection 10 of the second hydropump 3. An output connection 19a of the first partial hydromotor 16a of the third hydromotor 16 is connected to the input connection 9 of the second hydropump 3, whilst an output connection 19b of the second partial hydromotor 16b of the third hydromotor 16 is connected to the input connection 14 of the first hydropump 2. In contrast, an input connection 20a of the first partial hydromotor 17a of the fourth hydromotor 17 is connected to the output connection 10 of the second hydropump 3, whilst an input connection 20b of the second partial hydromotor 17b of the fourth hydromotor 17 is connected to the output connection 5 of the first hydropump 2. Finally, a common output connection 21 of the two partial hydromotors 17a and 17b of the fourth hydromotor 17 is connected to the input connection 14 of the first hydropump 2.

In this particular configuration of the hydropumps and hydromotors, it is ensured that all hydromotors 7, 12, 16 and 17 are connected either at their inlet or outlet to both hydropumps 2 and 3 and no hydromotor 7, 12, 16 and 17 is connected to the two hydropumps 2 and 3 in the same manner. In the event of slip in the drive line with which the hydromotors 7, 12, 16 and 17 are associated, it is therefore not possible for the hydromotor associated with this drive line to hydraulically by-pass the other hydromotors and extract absorption volumes. Slip or spinning of a drive wheel connected to the four different drive lines is therefore impossible with this configuration according to the invention.

Figure 5:
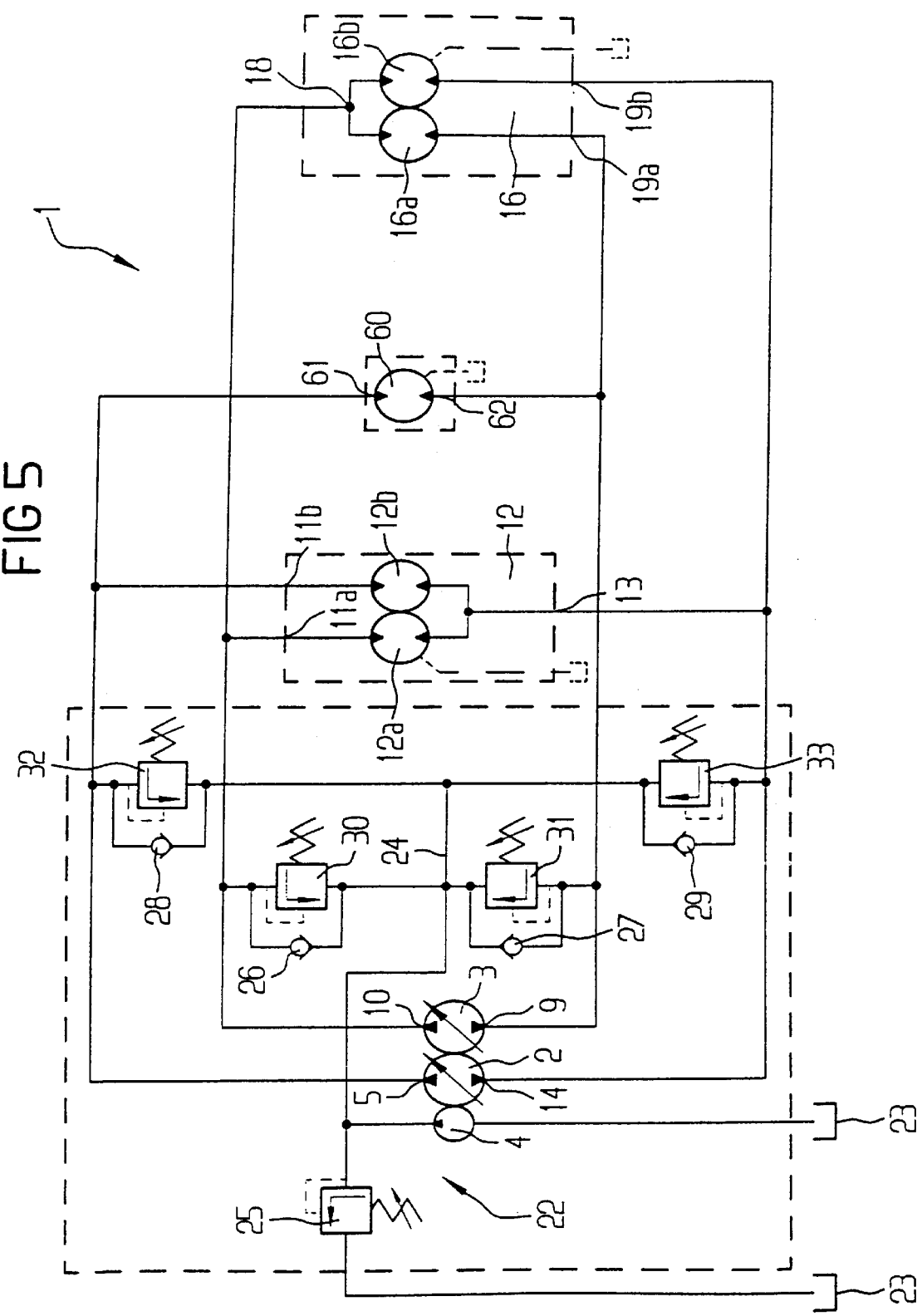
FIG. 5 is a hydraulic circuit diagram of a fifth embodiment of the hydrostatic vehicle drive according to the invention.

FIG. 5 shows a fifth embodiment of the hydrostatic vehicle drive 1 according to the invention which is a variant of the embodiment shown in FIG. 4. The first hydromotor 7 and the fourth hydromotor 17 are omitted in this design. Instead, a further hydromotor 60 is provided, which is constructed as a single hydromotor. An input connection 61 of the further hydromotor 60 is connected to the output connection 5 of the first hydropump 2, whilst an output connection 62 of the further hydropump 60 is connected to an input connection 9 of the second hydropump 3. This design is used for driving three vehicle wheels, two vehicle wheels combined to form a vehicle axle being driven by the hydromotors 12 and 16 and a third drive wheel or drive wheel being driven by the hydromotor 60. Instead of replacing the first hydromotor 7 and the fourth hydromotors 17, the further hydromotor 60 could also replace the third hydromotor 16 and the fourth hydromotor 17 or the first hydromotor 7 and the second hydromotor 12 as well as the second hydromotor 12 and the third hydromotor 16. Important is that the further hydromotor 60 does not disturb the flow equilibrium in the hydraulic circuit and that the distribution ratio of the conveyed flows of the individual hydropumps 2 and 3 is equal in each case.

Also in the circuit configuration illustrated in FIG. 5, it is ensured that slip cannot occur in the three drive wheels.

Figure 6:
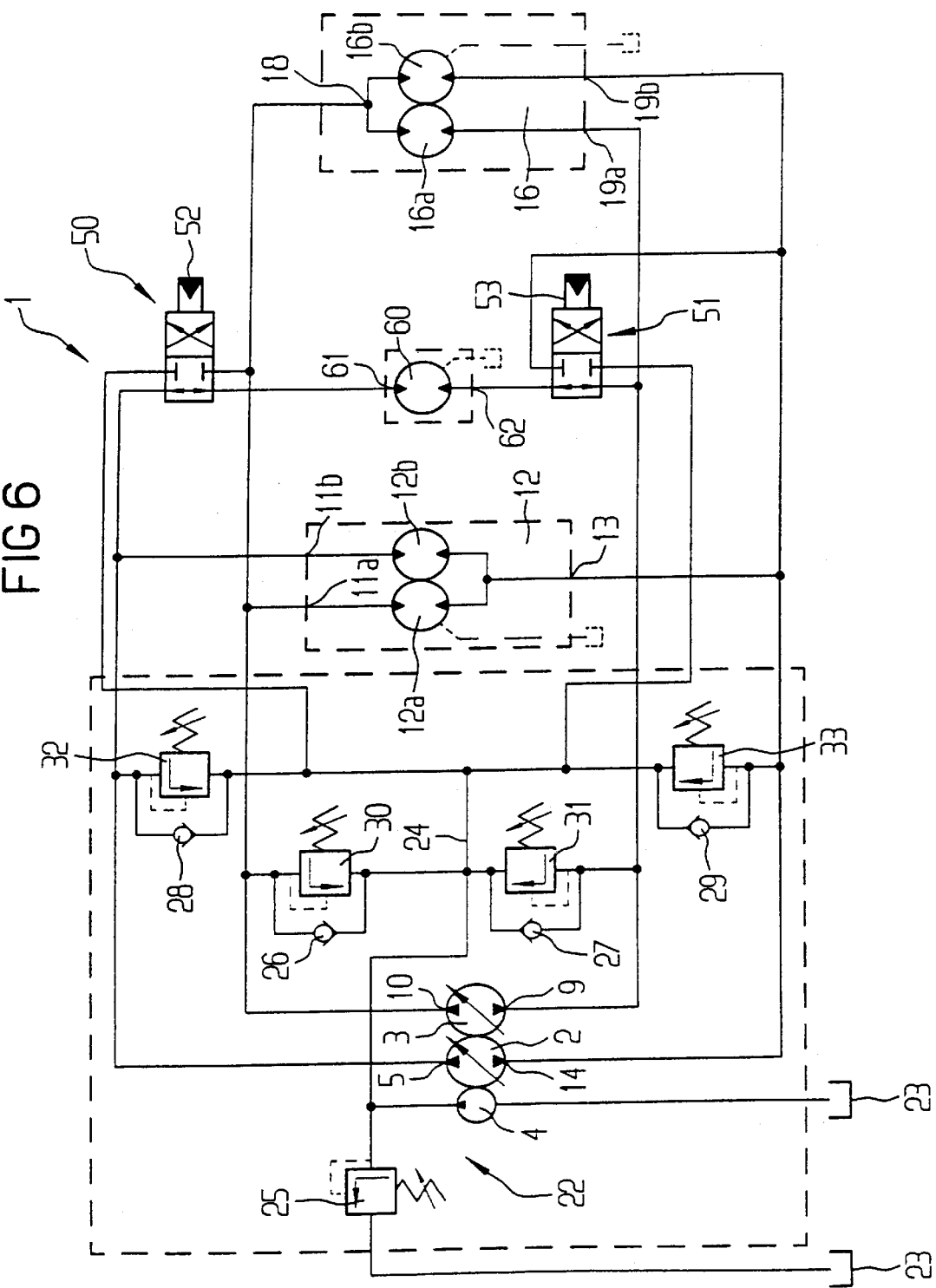
FIG. 6 is a hydraulic circuit diagram of a sixth embodiment of the hydrostatic vehicle drive according to the invention.

FIG. 6 shows a sixth embodiment of the hydrostatic vehicle drive 1 according to the invention. This embodiment is a variant of the embodiment already described with the aid of FIG. 5 in that additional switching valves 50 and 51 are provided, which can be actuated by means of electromagnetic transmitters 52 and 53. The switching valves 50 and 51 are used for switching off the hydromotor 60 as required. When the hydromotor 60 is switched off, both its input 61 and its output 62 are connected via the switching valves 50 and 51 to the supply line 22, so that the hydromotor 60 is adequately lubricated and cooled.

FIG. 7 shows a seventh embodiment of the hydrostatic vehicle drive 1 according to the invention. In contrast to the fifth embodiment already described with the aid of FIG. 5, in the embodiment of FIG. 7 additional by-pass valves 70 and 71 are provided, which can also be actuated electromagnetically by electromagnetic transmitters 72 and 73. The by-pass valves 70 and 71 make it possible to connect the outputs 5 and 10 of the two hydropumps 2 and 3 on the one hand and the inputs 9 and 14 of the two hydropumps 2 and 3 on the other hand with one another as required. The resulting parallel arrangement of all hydropumps and hydromotors offers advantages for individual applications.

What is claimed is:

1. A hydrostatic vehicle drive (1) with at least a first and a second hydropump (2, 3) and at least a first and a second hydromotor (7, 12), the hydromotors (7, 12) driving separate drive lines in each case, characterised in that, during straight-ahead travel operation, the hydropumps (2, 3) and the hydromotors (7, 12) are coupled with one another in a single closed hydraulic circuit without crossed connections in such a manner that an input connection (6) of the first hydromotor (7) is connected to an output connection (5) of the first hydropump (2), an input connection (9) of the second hydropump (3) is connected to an output connection (8) of the first hydromotor (7), an input connection (11) of the second hydromotor (12) is connected to an output connection (10) of the second hydropump (3) and an input connection (14) of the first hydropump (2) is connected to an output connection (13) of the second hydromotor (12).

2. A hydrostatic vehicle drive according to claim 1, characterised in that a changeover valve (40) is provided, which allows for a changeover from straight-ahead travel operation to bend travel operation, the first hydromotor (7) and the first hydropump (2) being connected to one another in a first closed hydraulic circuit and the second hydromotor (12) and the second hydropump (3) being connected to one another in a separate closed hydraulic circuit during bend travel operation.

3. A hydrostatic vehicle drive according to claim 2, characterised in that the changeover valve (40) is a 4/2-way valve with a first switching position (42) for the parallel connection of its inputs and outputs and a second switching position (43) for the crossed connection of its inputs and outputs.

4. A hydrostatic vehicle drive according to claim 1, characterised in that a third hydromotor (16) is connected in parallel to the first hydromotor (7) and a fourth hydromotor (17) is connected in parallel to the second hydromotor (12), the first (7) and third (16) hydromotors being associated with a first vehicle axle and the second (12) and fourth (17) hydromotors with a second vehicle axle.

5. A hydrostatic vehicle drive according to claim 4, characterised in that either the first (7) and the third (16) hydromotors or the second (12) and the fourth (17) hydromotors can be switched off by means of switching valves (50, 51).

6. A hydrostatic vehicle drive according to claim 5, characterised in that the switching valves (50, 51) are constructed in such a manner that the switched-off hydromotors (12, 17) are supplied with a supply pressure via a supply device (22).

7. A hydrostatic vehicle drive with at least a first and a second hydropump (2, 3) and at least a first and a second hydromotor (7, 12), the hydromotors (7, 12) driving separate drive lines in each case, characterised in that the hydromotors (7, 12) are double hydromotors, each with two partial hydromotors (7a, 7b; 12a, 12b) and the hydropumps (2, 3) and the hydromotors (7, 12) are coupled with one another in a closed hydraulic circuit in such a manner that a common input connection (6) of the two partial hydromotors (7a, 7b) of the first hydromotor (7) is connected to an output connection (5) of the first hydropump (2), an output connection (6a) of the first partial hydromotor (7a) of the first hydromotor (7) is connected to an input connection (9) of the second hydropump (3), an output connection (6b) of the second partial hydromotor (7b) of the first hydromotor (7) is connected to an input connection (14) of the first hydropump (2), an input connection (11a) of the first partial hydromotor (12a) of the second hydromotor (12) is connected to an output connection (10) of the second hydropump (3), an input connection (11b) of the second partial hydromotor (12b) of the second hydromotor (12) is connected to the output connection (5) of the first hydropump (2), and a common output connection (13) of the two partial hydromotors (12a, 12b) of the second hydromotor (12) is connected to the input connection (9) of the second hydropump (3).

8. A hydrostatic vehicle drive according to claim 7, characterised in that a third hydromotor (16) comprising two partial hydromotors (16a, 16b) and a fourth hydromotor (17) likewise comprising two partial hydromotors (17a, 17b) are additionally provided, and the hydropumps (2, 3) and the third and fourth hydromotors (16, 17) are coupled with one another in the closed hydraulic circuit in such a manner that a common input connection (18) of the two partial hydromotors (16a, 16b) of the third hydromotor (16)

is connected to the output connection (10) of the second hydropump (3), an output connection (19*a*) of the first partial hydromotor (16*a*) of the third hydromotor (16) is connected to the input connection (9) of the second hydropump (3), an output connection (19*b*) of the second partial hydromotor (16*b*) of the third hydromotor (16) is connected to the input connection (14) of the first hydropump (2), an input connection (20*a*) of the first partial hydromotor (17*a*) of the fourth hydromotor (17) is connected to the output connection (10) of the second hydropump (3), an input connection (20*b*) of the second partial hydromotor (17*b*) of the fourth hydromotor (17) is connected to the output connection (5) of the first hydropump (2), and a common output connection (21) of the two partial hydromotors (17*a*, 17*b*) of the fourth hydromotor (17) is connected to the input connection (14) of the first hydropump (2).

9. A hydrostatic vehicle drive according to claim 8, characterised in that two hydromotors (7, 17; 12, 16) drive a common vehicle axle in each case.

10. A hydrostatic vehicle drive according to claim 7, characterised in that a third hydromotor (60) is provided, whose input connection (61) is connected to the output connection (5) of the first hydropump (12) and whose output connection (62) is connected to the input connection (9) of the second hydropump (3).

11. A hydrostatic vehicle drive according to claim 10, characterised in that the first and second hydromotors drive a common vehicle axle and the third hydromotor (60) drives a further vehicle wheel or wheel axle.

12. A hydrostatic vehicle drive according to claim 10, characterised in that the third hydromotor (60) can be switched off by means of switching valves (50, 51).

13. A hydrostatic vehicle drive according to claim 12, characterised in that the switching valves (50, 51) are constructed in such a manner that the switched-off hydromotor (60) is supplied with a supply pressure via a supply device (22).

14. A hydrostatic vehicle drive according to claim 7, characterised in that by-pass valves (70, 71) are provided between the input connections (5, 10) and the output connections (14, 9) of the hydropumps (2, 3) in order to connect the input connections (5, 10) and the output connections (14, 9) of the hydropumps (2, 3) with one another when required.

* * * * *